United States Patent
Lind et al.

(10) Patent No.: US 9,423,794 B2
(45) Date of Patent: Aug. 23, 2016

(54) CONTROL SYSTEM FOR TRAVEL IN A PLATOON

(75) Inventors: Henrik Lind, Torslanda (SE); Jonas Ekmark, Olofstorp (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 13/700,318

(22) PCT Filed: May 30, 2011

(86) PCT No.: PCT/EP2011/058788
§ 371 (c)(1),
(2), (4) Date: May 2, 2013

(87) PCT Pub. No.: WO2011/151274
PCT Pub. Date: Dec. 8, 2011

(65) Prior Publication Data
US 2013/0211624 A1    Aug. 15, 2013

(30) Foreign Application Priority Data
May 31, 2010    (EP) .................................. 10164446

(51) Int. Cl.
G05D 1/02    (2006.01)
G08G 1/00    (2006.01)
G01S 13/93    (2006.01)

(52) U.S. Cl.
CPC ............ G05D 1/021 (2013.01); G05D 1/0278 (2013.01); G05D 1/0295 (2013.01); G08G 1/22 (2013.01); G01S 2013/9325 (2013.01); G05D 2201/0213 (2013.01)

(58) Field of Classification Search
None
See application file for complete search history.

(56) References Cited

U.S. PATENT DOCUMENTS 6,032,097 A    2/2000   Iihoshi et al.
6,128,559 A *  10/2000  Saitou et al. ................... 701/23

(Continued)

FOREIGN PATENT DOCUMENTS

CN    10248469 A    8/2008
EP    1708065 A2    10/2006

(Continued)

OTHER PUBLICATIONS

Hewlett Packard Application Note 1272, "GPS and Precision Timing Applications," May 1996.*

(Continued)

*Primary Examiner* — John R Olszewski
*Assistant Examiner* — Gerrad A Foster
(74) *Attorney, Agent, or Firm* — Gesmer Updegrove LLP (57) ABSTRACT

The present invention relates to a control system for travel in a platoon (1), the platoon comprising a lead vehicle (L) and one or more following vehicles ($F_1, F_2, \ldots, F_{i-1}, F_i, \ldots, F_n$) automatically following the lead vehicle, the lead vehicle controlling the movement of the following vehicles, each of the following vehicles and the lead vehicle comprising communication means (10, 12), wherein the control system comprises a common time base, which allows a control command proposing an action to be communicated from the lead vehicle (L) to at least one of the following vehicles ($F_1, F_2, \ldots, F_{i-1}, F_i, \ldots, F_n$) in advance of a control point ($t_c$). The invention further relates to the use of a common time base in a platoon and to a method to control travelling in a platoon.

18 Claims, 4 Drawing Sheets

(56) References Cited

U.S. PATENT DOCUMENTS

| 7,124,027 B1* | 10/2006 | Ernst et al. ............... 701/301 |
| 2009/0079839 A1 | 3/2009 | Fischer et al. |
| 2010/0256852 A1* | 10/2010 | Mudalige ............... 701/24 |

FOREIGN PATENT DOCUMENTS

| JP | 11-339185 A | 12/1999 |
| JP | 2000-339600 | 12/2000 |
| JP | 2008-003675 | 1/2008 |
| JP | 2009-40351 A | 2/2009 |
| JP | 2009-157794 | 7/2009 |
| WO | 2008018607 A1 | 2/2008 |

OTHER PUBLICATIONS

The International Search Report and Written Opinion issued on Aug. 9, 2011 in connection with PCT Application No. PCT/EP2011/058788.

Porche et al., "Real time task manager for communications and control in multicar platoons" Intelligent Vehicles '92 Symposium, Proceedings of the Detroit, MI, USA Jun. 1-29, 1992, New York, NY, pp. 409-414.

Office Action issued by the Japanese Patent Office on Sep. 1, 2015 in connection with related Japanese Patent Application No. 2013-512854 and English translation thereof, 9 pages.

* cited by examiner

CONTROL SYSTEM FOR TRAVEL IN A PLATOON

PRIORITY INFORMATION

The present application is a 371 national phase application of International Application No. PCT/EP2011/058788, filed on May 30, 2011, that claims priority to EP Application No. 10164446.6, filed on May 31, 2010.

TECHNICAL FIELD

The present invention relates to a control system for processional travel in a platoon comprising a lead vehicle and one or more following vehicles automatically following the lead vehicle. The invention further relates to the use of a common time base in a platoon and to a method for controlling travelling in a platoon.

BACKGROUND OF THE INVENTION

Driving self-propelled vehicles in a convoy generally requires a driver for each vehicle. As an alternative, so called platooning may be used. A platoon comprises a lead vehicle and at least one following vehicle. When the platoon moves, the lead vehicle controls the movement of the following vehicles by means of inter-vehicle communication. By using platooning the need to drive the following vehicles may be eliminated. Further, the distances between the vehicles of the platoon, i.e. the inter-vehicle distances, may be shortened as compared to distances between vehicles in normal traffic, thereby increasing transport capacity of for example a road. Short distances between vehicles of a platoon have also been proven to reduce air resistance, and thereby reduce fuel consumption.

The document U.S. Pat. No. 6,640,164 B1, by Farwell and Caldwell, discloses a system for remote control of self-propelled vehicles, especially vehicles in a convoy. The lead vehicle takes a succession of GPS coordinate positions along the way and broadcasts them to a following vehicle, so that it can traverse the same course as the lead vehicle.

Since the lead vehicle of the system disclosed in U.S. Pat. No. 6,640,164 B1 sends the GPS coordinates of the waypoints it has passed, the control of the following vehicles is based on events in the past, though in the recent past.

There is a desire to be able to make the inter-vehicle distances even shorter than in existing platooning in order to increase the above-mentioned positive effects. There is therefore a desire for an improved control system for travelling in a platoon.

SUMMARY OF THE INVENTION

The object of the present invention is to overcome or ameliorate at least one of the disadvantages of the prior art, or to provide a useful alternative.

It is desirable to provide a control system allowing short distances between the vehicles of the platoon.

It is further desirable to provide a control system, which is able to react in advance of a control point.

One or more of the objects may be achieved by the invention according to claim 1.

In a first aspect of the present invention there is provided a control system for travel in a platoon. The platoon comprises a lead vehicle and one or more following vehicles automatically following the lead vehicle. The lead vehicle controls the movement of the following vehicles. Each of the following vehicles and the lead vehicle comprise communication means. The control system comprises a common time base, which allows a control command proposing an action to be communicated from the lead vehicle to at least one of the following vehicles in advance of a control point.

The distance between the vehicles in the platoon is short in order to be able to use the advantage of reduced air resistance and thereby reduced fuel consumption. However, the vehicles are not mechanically connected.

A control command comprises a control point $t_c$ and an action. The control point $t_c$ is a point of time, and the accompanying action is intended to be executed at that particular point of time.

The desire for short inter-vehicle distances sets a precision requirement for the common time base. The more precise the time base is, the better precision of the control system. This makes shorter inter-vehicle distances possible, leading to reduced air resistance and thereby improved fuel economy. The use of a common time base for the vehicles of the platoon facilitates short inter-vehicle distances.

Moreover, by communicating proposed actions in advance of the control point $t_c$, it is possible for the vehicles to prepare actions, e.g. pre-charge brakes, instead of reacting, that is acting afterwards.

In an embodiment, the common time base has a precision of at least 10 ms, preferably at least 1 ms and most preferably at least 100 µs.

As mentioned above, the inter-vehicle distances should preferably be kept short. In an embodiment, the inter-vehicle distance corresponds to a time gap between two vehicles of less than 0.6 s. With such short time gaps, it is difficult or even impossible to drive the following vehicle manually. Therefore, platooning makes it possible to have shorter inter-vehicle distances as compared to driving the following vehicles individually, especially when a common time base is used as disclosed by the invention.

In a preferred embodiment, the common time base is based on signals from an external clock, such as the clock of a GNSS (Global Navigation Satellite System) e.g. GPS (Global Positioning System, UTC time (Coordinated Universal Time) or an atomic time-based clock. By using an external clock, the time signals may be received simultaneously by all vehicles in the platoon. It may be advantageous to use the GPS time, since the vehicles may anyway use GPS for determining their positions. The use of an external time base, which is common to all vehicles in the platoon, makes it possible to synchronize the clock of an individual vehicle, i.e. setting the time base of that particular vehicle, with the clocks of the other vehicles of the platoon, especially with the lead vehicle.

If, for some reason, the signals of the external clock cannot be received, e.g. when driving through a tunnel, the time base of each vehicle may be based on the last signal received from the external clock. The lead vehicle may keep track of the clocks of the following vehicles, and if at least one of them differs by more than a predefined amount, the lead vehicle may send out a synchronization signal or repeated synchronization signals, for example once per second. As an alternative, the lead vehicle may start sending out a time signal as soon as the contact to the external clock is broken. The other vehicles may then synchronize their clocks with the lead vehicle.

As an alternative, or a complement, to an external clock, the common time base may be based on a clock of the lead vehicle, wherein the time signal of the clock is communicated to the following vehicles from the lead vehicle.

Preferably, the control command is adapted to compensate for dynamic properties of the at least one following vehicle. By adopting the control command to the actual dynamic properties of the following vehicles and/or time delays within the platoon, the inter-vehicle distances may be optimized. Account should be taken of the dynamics of the vehicle having the poorest dynamics for that particular action.

In an embodiment of the present invention, the proposed action may comprise an action expressed as a state control over time for the following vehicle. The control command is then provided as a proposed action expressed as a function of time, e.g. acceleration over time, deceleration over time, target speed over time, inter-vehicle distance over time, steering radius over time or position over time. The control command may be transmitted in parameterized form, i.e. in the form of a mathematical formula, or as a curve versus time. These types of control commands set a high demand for precision of the time base in order to work. If the lead vehicle instead would have sent a set of subsequent commands linked to their respective control points $t_c$, the following vehicles would not understand the intention of the lead vehicle. Moreover, the load of the communication system could also be higher, especially if acknowledgement and execute commands are used, as described below.

In an embodiment, it is required to acknowledge the receipt of the control command to the lead vehicle. As an option, the proposed action may not be carried out before the following vehicle has received an execute demand sent by the lead vehicle.

In one embodiment of the control system, the following vehicle may, upon receipt of the control command from the lead vehicle, communicate to the lead vehicle, that the following vehicle is able or unable to carry out the proposed action according to the control command. If unable is communicated, the following vehicle may additionally propose to the lead vehicle a possible limited state action instead of the proposed action according to the control command sent from the lead vehicle. The lead vehicle may then send a new control command based on the limited state action. Alternatively, the lead vehicle may decide to release the platoon after first having sent a control command to increase the inter-vehicle distances.

The control systems may further comprise a negotiation, which is used when a candidate following vehicle wants to connect to the platoon. The negotiation comprises sending of boundaries for state control of the candidate following vehicle. The candidate following vehicle may be refused to connect to the platoon, if the candidate following vehicle has a too limited state control capability. Moreover, the negotiation is not restricted to being used in conjunction with the claimed control system, but could be used in any platoon control system.

In a second aspect of the present invention, there is provided a use of a common time base in a platoon comprising a lead vehicle and one or more following vehicles automatically following the lead vehicle. The lead vehicle controls the movement of the following vehicles. Each of the following vehicles and the lead vehicle comprise communication means. The use of the common time base allows a control command proposing an action to be communicated from the lead vehicle to at least one of the following vehicles in advance of a control point.

In a third aspect of the present invention there is provided a method for controlling travelling in a platoon. The platoon comprises a lead vehicle and one or more following vehicles automatically following the lead vehicle. The lead vehicle controls the movement of the following vehicles. Each of the following vehicles and the lead vehicle comprise communication means.

The method comprises the steps of
a) establishing a common time base.
b) transmitting a control command proposing an action from the lead vehicle to at least one of the following vehicles in advance of a control point.

The common time base facilitates a control command proposing an action to be communicated from the lead vehicle to at least one of the following vehicles in advance of a control point.

Step a) is typically done on a regular basis, but it should preferably have been done at least once before performing step b).

In addition, the method may comprise the step of:
c) the at least one of the following vehicles acknowledging the receipt of the control command to the lead vehicle;
and the optional step of:
d) the lead vehicle sending an execute demand.

The method may further comprise, preferably just before, just after, in conjunction with or instead of step c), the step of:
e) the at least one of the following vehicles communicating a message to the lead vehicle that the following vehicle is able or unable to carry out the proposed action according to the control command.

The method may in that case skip step d).

In the case able was communicated, the method may further comprise the step:
f) the lead vehicle transmitting an execute command based on step b).

In the case unable was communicated, the method may further comprise the step:
g) the at least one of the following vehicles communicating to the lead vehicle a possible limited state action;
and the optional step of:
h) the method returns to step b) and the lead vehicle transmitting a new control command based on the limited state action, or alternatively the lead vehicle releasing the platoon;

BRIEF DESCRIPTION OF THE DRAWINGS

The present invention will hereinafter be further explained by means of non-limiting examples with reference to the appended figures wherein.

DETAILED DESCRIPTION OF PREFERRED EMBODIMENTS

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
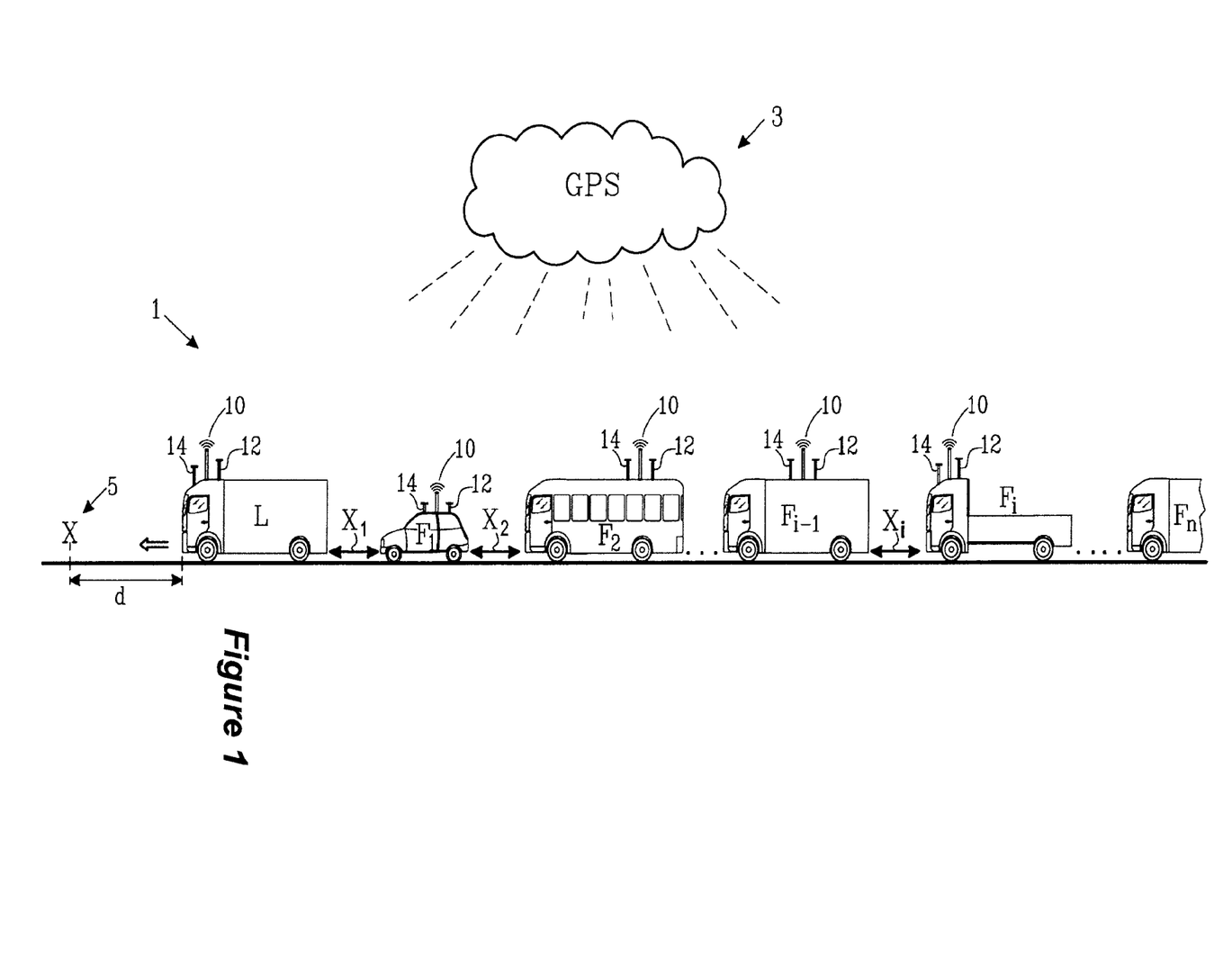
FIG. 1 illustrates a platoon being controlled by a control system according to the invention.

FIG. 1 schematically illustrates a platoon 1 being controlled by a control system according to the invention. A lead vehicle L is followed by a number n of following vehicles ($F_1$, $F_2$, . . . , $F_{i-1}$, $F_i$, . . . , $F_n$). The vehicles travel in a procession. The number n of following vehicles is a positive integer {1, 2, 3, 4, 5, 6 . . . }. Number i is a counter going from 1 to n. The lead vehicle L has a human driver or is run under human supervision, while the following vehicles are not actively driven by a driver. The lead vehicle L of the platoon controls the following vehicles of the platoon by means of inter-vehicle communication. The vehicles of the platoon may for example be cars, buses, trucks or lorries.

Each vehicle has a certain distance between itself and the vehicle being immediately in front of it. Following vehicle $F_1$ has the distance $x_1$ to the lead vehicle L, following vehicle $F_2$ has the distance $x_2$ to the vehicle $F_1$ just ahead, and following vehicle $F_i$ has the distance $x_i$ to the vehicle $F_{i-1}$ just ahead and so on. The inter-vehicle distances $x_i$ may be the same in the whole platoon, or they may vary. Preferably, the inter-vehicle distances $x_i$ are adapted to the characteristics of the individual vehicles, e.g. dynamic behaviour at acceleration or braking. Further, the inter-vehicle distance may depend on factors such as, speed of platoon, state of the road, surrounding traffic, etc. The lead vehicle L, or more precisely the control system of the lead vehicle, i.e. the first controller, may determine the inter-vehicle distances $x_i$. In a preferred embodiment of a control system according to the invention, each vehicle has its own controller, a secondary controller, which among other things controls the distance $x_i$ to the vehicle just ahead. The inter-vehicle distance $x_i$ may be determined by means of a commonly used distance sensor, such as by laser distance measurement, and/or by means of a GPS unit of the respective vehicle.

The lead vehicle L controls the following vehicles by means of control commands. A control command comprises a control point $t_c$ and an action. The control point $t_c$ is a point of time, and the accompanying action is intended to be executed at that particular point of time. The lead vehicle L can send individual control commands to the individual following vehicles F. As an alternative, it may also send a general command comprising control commands for two or more of the following vehicles. In that case the control command also comprises information about which following vehicle is intended, e.g. by using an identification unique for each vehicle. The control commands may be continuously updated.

The vehicles of the platoon are equipped with communication means, here in the form of transmitters 10 and receivers 12. The lead vehicle L may send a control command via the transmitter 10 to a following vehicle $F_i$ proposing an action. The following vehicle $F_i$ receives the control command via its receiver 12. The communication between the vehicles may follow DSRC, i.e. Dedicated Short-Range Communication, or IEEE 802.11p, p denoting a variant suitable for vehicles. The communication between the vehicles may also be achieved by means of cellular communication.

As an option, the following vehicle $F_i$ may additionally have a transmitter 10, such that itself can send messages to another vehicle of the platoon, e.g. to the lead vehicle L, which in that case should have a receiver 12 to be able to receive the message. This option may be used by the following vehicle $F_i$ in order to acknowledge the receipt of the control command sent by the lead vehicle L. If a vehicle has both a transmitter 10 and a receiver 12, they may be combined into one transmitter-receiver unit.

The control system of the invention further comprises a common time base. In the first embodiment of FIG. 1, this is exemplified by the use of GPS time 3, GPS=Global Positioning System. The lead vehicle L and the following vehicles $F_1$, $F_2$, . . . , $F_{i-1}$, $F_i$, . . . , $F_n$ therefore have GPS receivers 14. Each vehicle may thus keep track of the common time base. It is also possible to use other external clocks, such as UTC, i.e. Coordinated Universal Time. Preferably, an external clock should be used, the time signals of which may be received simultaneously by all vehicles in the platoon. It may be advantageous to use the GPS time, since the vehicles may anyway use GPS units for determining their positions. The receiver 12 and the GPS receiver 14 may be combined into one receiver, possibly also combined with the transmitter 10.

The use of an external time base, which is common to all vehicles in the platoon, makes the clock of an individual vehicle synchronized with the clocks of the other vehicles of the platoon, especially with the lead vehicle. Preferably, the precision of the clock of the individual vehicle is at least 10 ms, preferably at least 1 ms and most preferably at least 100 μs.

The above-mentioned GPS time and UTC time uses PPS, i.e. pulse per second, and sends one pulse every second. The frequency of the pulses is clearly defined, which makes it possible to achieve a precision in the picosecond or nanosecond range.

The synchronization of the clocks of the individual vehicles may also occur with a frequency determined by the lead vehicle. If the uncertainty of a certain clock in a vehicle is known, the synchronization frequency of that clock may be adapted to this, such that synchronization is performed more often for a more variable clock than for a more stable clock. The synchronization may in that case be initialized by the lead vehicle or by the following vehicle itself.

FIG. 1 further illustrates that the platoon 1 approaches a control point $t_c$, here illustrated by an X marking the corresponding spatial position 5 of the lead vehicle L at the time t, of the control point. In general, the following vehicles $F_1$, $F_2$, . . . , $F_{i-1}$, $F_i$, . . . , $F_n$ are expected to, after having received a control command, undertake actions required to follow the control command. Typically, the control command is transmitted from the lead vehicle L and received a few hundreds of seconds to a second before execution.

Figure 2:
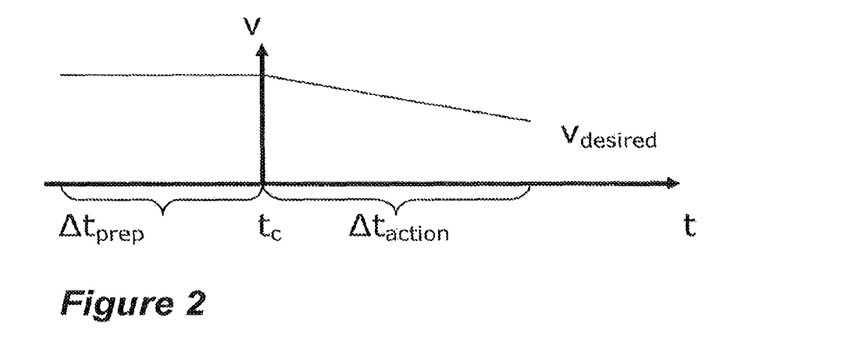
FIG. 2 illustrates the course of events during a control command.

FIG. 2 illustrates what happens when a control command is sent out. Purely as an example, it is assumed that the control command associated with the control point $t_c$ states that the vehicles of the platoon should at the time of the control point t, start adjusting their speed in order to achieve a desired speed $v_{desired}$. Before the vehicles can actually start adjusting their speeds, certain time delays should be taken into account, such as reaction time of the driver of the lead vehicle, handshaking time for the communication of control commands to the following vehicles and time for braking preparation, e.g. building up braking pressure. This preparation time is denoted $\Delta t_{prep}$ in FIG. 2 and corresponds to the platoon driving the distance denoted by d in FIG. 1. The control command should at the latest be transmitted at the time $t_c - \Delta t_{prep}$ in order to allow for the time delays. The time interval during which the action is carried out is denoted $\Delta t_{action}$, and its length is influenced by the dynamic behaviour of the individual vehicles. The desired speed should be achieved at the time $t_c + \Delta t_{action}$. Account should be taken of the largest time an individual vehicle needs for the particular desired adjustment when selecting $\Delta t_{action}$, since otherwise the vehicles in the platoon would risk impacting each other.

Figure 3:
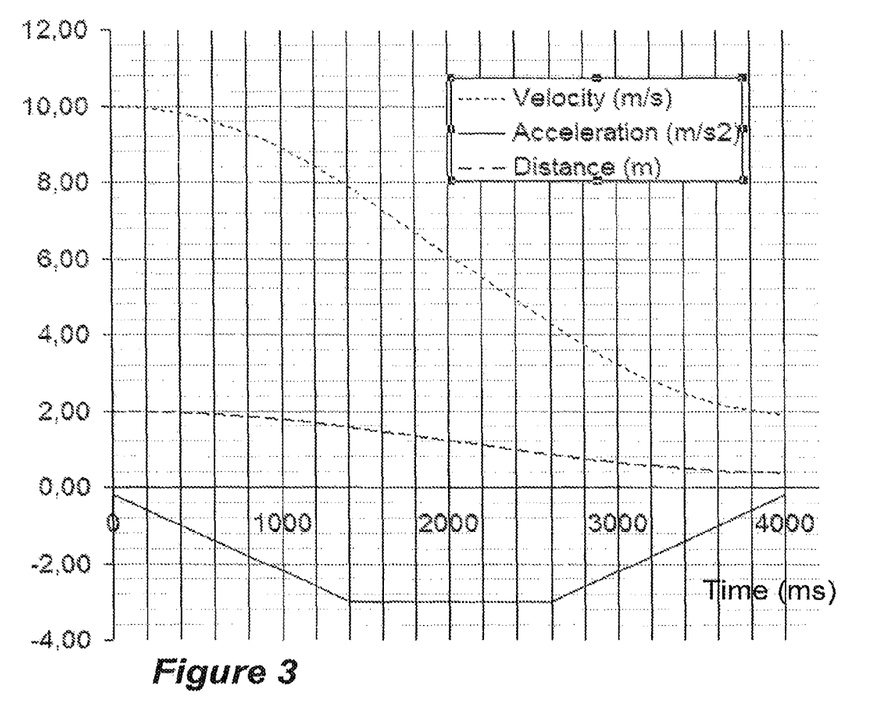
FIG. 3 illustrates control commands expressed as functions of time.

The control commands sent from the lead vehicle L to any of the following vehicles $F_1, F_2, \ldots, F_{i-1}, F_i, \ldots, F_n$ may comprise an action expressed as a state control over time, for example acceleration over time, deceleration over time, target speed over time, inter-vehicle distance over time, steering radius over time or position over time. In this respect reference is made to FIG. 3, in which the x axis represents time in milliseconds after the control point $t_c$. Distance relates to the inter-vehicle distance to the vehicle being just ahead.

If different control commands are in conflict with each other, for example one command stating a certain inter-vehicle distance and another control command stating a desired speed increase, the control command most important for safety will be prioritized, in this example, the inter-vehicle distance.

If, for some reason, the signals of the external clock cannot be received, e.g. when driving through a tunnel, the time base of each vehicle may be based on the last signal received from the external clock. The lead vehicle L may keep track of the clocks of the following vehicles, and if at least one of them differs by more than a predefined amount, the lead vehicle may send out a synchronization signal or repeated synchronization signals, for example once per second. As an alternative, the lead vehicle may start sending out a time signal as soon as the contact to the external clock is broken. The other vehicles may then synchronize their clocks with the lead vehicle.

In a second embodiment of a control system according to the invention, the time signal forming the common time base is sent from the lead vehicle L, for example once a second, eliminating the need for an external clock. Preferably, the precision of the clock of the individual vehicle is at least 10 ms, preferably at least 1 ms and most preferably at least 100 μs. If the time signal from the lead vehicle L is obscured or blocked for some reason, the time base of each following vehicle $F_i$ may be based on the last signal received from the lead vehicle L.

Figure 4:
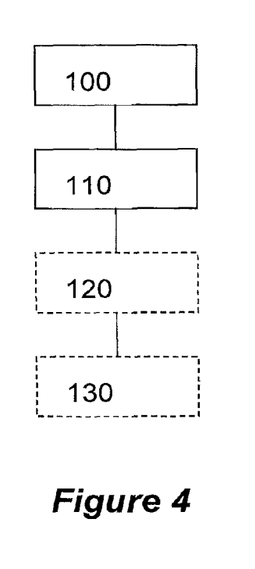
FIG. 4 illustrates a method according to the invention.

Another aspect of the invention provides a method for controlling travelling in a platoon as shown in FIG. 4. The method comprises the following steps, whereof some are optional as explained below and seen as dashed boxes:

100: a) establishing a common time base;
110: b) transmitting, in advance of a control point, a control command including the control point $t_c$ and a proposed action from the lead vehicle L to at least one of the following vehicles $F_1, F_2, \ldots, F_{i-1}, F_i, \ldots, F_n$;
120: c) the at least one of the following vehicles acknowledging the receipt of the control command to the lead vehicle L;
130: d) the lead vehicle sending an execute demand.

In the most general form the suggested method according to the invention comprises only steps 100: a) and 110: b). The action is in that case executed at the right moment thanks to the common time base. As explained above, step a) is typically done on a regular basis, but it should at least have been done once before performing step b).

The method may be enlarged by step 120: c) the following vehicle $F_i$ acknowledging the receipt of the control command back to the lead vehicle L. In an embodiment, it is desired that all following vehicles acknowledge their respective control commands. As an option, the proposed action may not be carried out before the following vehicle $F_i$ also has received an execute demand, which in that case is sent in step 130: d).

Figure 5:
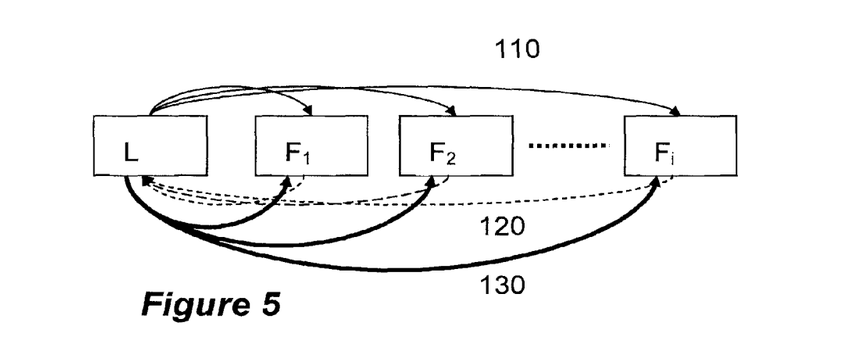
FIG. 5 illustrates inter-vehicle communication in the method of FIG. 4.

FIG. 5 illustrates the method steps shown in FIG. 4 as inter-vehicle communication:
110: Control commands (thin lines) are sent to the following vehicles $F_1, F_2, \ldots, F_{i-1}, F_i, \ldots, F_n$ from the lead vehicle L. The control command includes the control point $t_c$ and a proposed action to at least one of the following vehicles. A control command may be sent to each following vehicle as illustrated. Alternatively, a general control command may be sent comprising the control commands for more than one, preferably all, individual vehicles. In that case, the individual vehicles should be able to identify which control command is intended for a certain vehicle.
120: The following vehicles acknowledge the receipt of the control command back to the lead vehicle L (dashed lines).
130: The lead vehicle sends an execute command to each following vehicle, either an individual command to the respective following vehicle (thick lines) or a general execute command comprising execute commands for more than one, preferably all, vehicles.

Figure 6:
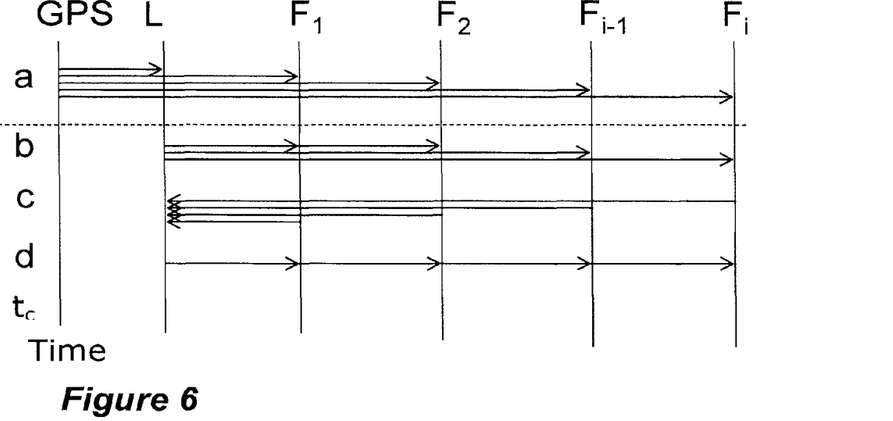
FIG. 6 illustrates a time-control diagram of the method illustrated in FIG. 4.

FIG. 6 is a time-control diagram of the method illustrated in FIG. 5. The time axis is directed downwards in the figure. Step a) is independent of the other steps and may be repeated regularly as explained above. A control command is transmitted in step b) to each following vehicle individually and acknowledged in step c). An execute demand is sent in step d). At the time $t_c$, the proposed action is carried out.

Figure 7:
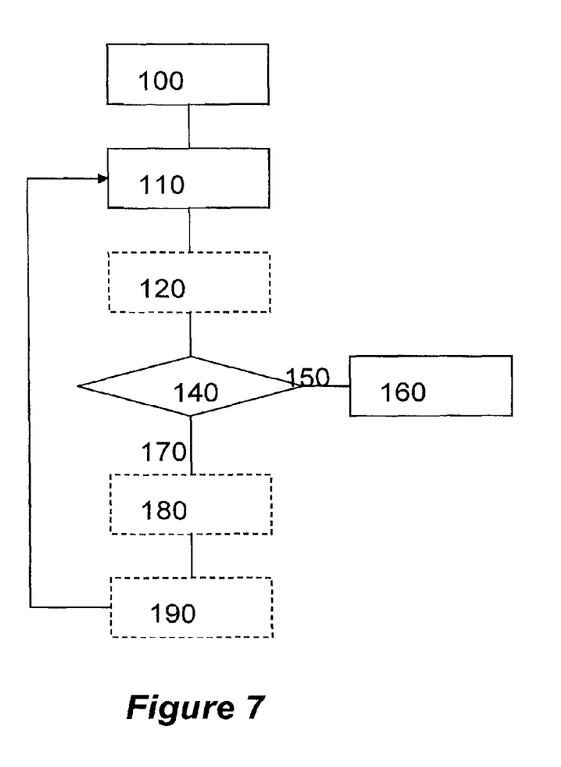
FIG. 7 illustrates another method according to the invention.

In an alternative embodiment of the method, see FIG. 7, the method may comprise a further step instead of step c) or as a complement to step c). Step a) and b) are as above:
100: a) establishing a common time base;
110: b) transmitting, in advance of a control point, a control command including the control point $t_c$ and a proposed action from the lead vehicle L to at least one of the following vehicles $F_1, F_2, \ldots, F_{i-1}, F_i, \ldots, F_n$;
optional step 120: c) the at least one of the following vehicles $F_1, F_2, \ldots, F_{i-1}, F_i, \ldots, F_n$ acknowledging the receipt of the control command to the lead vehicle L;
140: e) the at least one of the following vehicles $F_1, F_2, \ldots, F_{i-1}, F_i, \ldots, F_n$ communicating a message to the lead vehicle L that the following vehicle $F_1, F_2, \ldots, F_{i-1}, F_i, \ldots, F_n$ is "able" 150 or "unable" 170 to carry out the proposed action according to the control command.
160: f) In the case that "able" 150 was communicated in step e) the lead vehicle may send an execute command based on step b).

In the case that "unable" 170 was communicated in step e) the following steps may occur:
180: g) the at least one of the following vehicles $F_1, F_2, \ldots, F_{i-1}, F_i, \ldots, F_n$ communicating to the lead vehicle L a possible limited state action.
190: h) the method returning to step b) 110 and the lead vehicle L sends a new control command based on the possible limited state action.

The lead vehicle L can at any time decide to release the platoon. A typical situation is when "unable" is communicated from one of the following vehicles. The release can either be total or partial. Total release means that the platoon is split up into its individual vehicles. The release may start from the tail end, which is preferred in general, or anywhere in the platoon, which may be preferred in special situations, such as an object entering the platoon from the side, for example an elk running up on to the road. In a partial release, the platoon may be split into one or more sub-platoons, each sub-platoon then forming a new platoon. At release of the platoon, the inter-vehicle distance is increased, state control is taken over by the following vehicle being released and an alert is sent to its driver. It is also possible to give any vehicle in the platoon permission to release the platoon if desired or needed.

In the case describe above, it may therefore be an alternative to step 190 to release the platoon, if "unable" 170 is communicated in step e).

Figure 8:
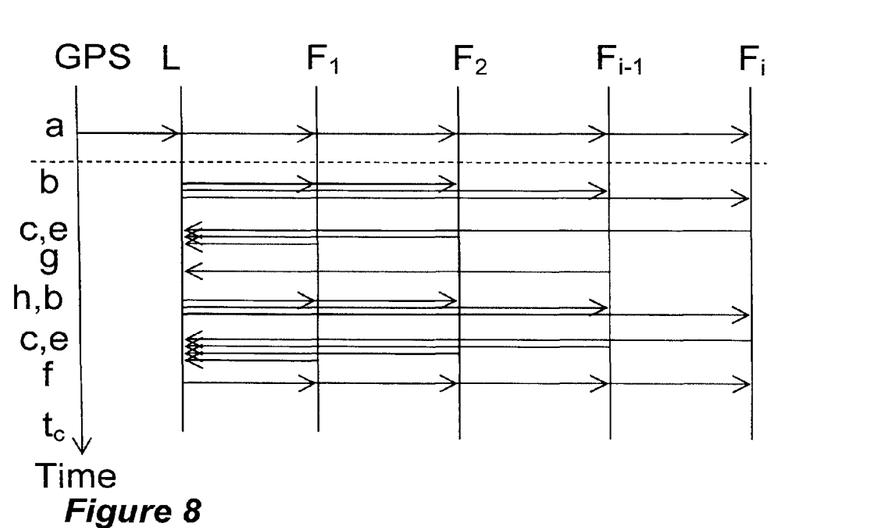
FIG. 8 illustrates a time-control diagram of the method illustrated in FIG. 7.

FIG. 8 is a time-control diagram of the method illustrated in FIG. 6. The time axis is directed downwards in the figure. Step a) is independent of the other steps and may be repeated as explained above. A control command is transmitted in step b) and acknowledged in step c). The following vehicles $F_1$, $F_2$ and $F_i$ communicate in step e) that they are "able" to carry out the proposed action, while one following vehicle $F_{i-1}$ communicates "unable". That vehicle also sends a possible limited state action, step g). In step h) the method returns to step b) and the lead vehicle sends a new control command comprising a new proposed action considering the limited state. The following vehicles, acknowledge the receipt, step c). This time all following vehicle are "able" to carry out the control command, step e) and in step f) the lead vehicle sends an execute command based on the new proposed action. At the time t, the new proposed action is carried out.

All vehicles of the platoon may optionally be able to retransmit control commands and act as a transponder for messages sent in between the vehicles.

In another aspect of the present invention, the control system of the invention also comprises a negotiation at connection of a candidate following vehicle to the platoon. The candidate following vehicle may enter the platoon anywhere along the platoon, but preferably it is added at the tail end of the platoon. The negotiation may either be initiated by the lead vehicle L or by the candidate following vehicle. In a preferred embodiment of a control system comprising negotiation, each vehicle has a unique identity. Further, each vehicle has its own controller, a secondary controller, which e.g. controls the distance $x_i$ to the vehicle just ahead.

The negotiation is done by means of communication between the vehicles. Thereby the lead vehicle L and the vehicle just ahead of the candidate following vehicle are identified. The lead vehicle L knows what other vehicles are in the platoon. Further, preferably, each following vehicle knows at least what vehicle it has just ahead and just behind. The candidate following vehicle also communicates its current driving data such as position, speed and acceleration.

The negotiation further comprises sending of the boundaries for state control of the candidate following vehicle to the lead vehicle. Since the lead vehicle knows the boundaries for state control of the already connected following vehicles, the control of the platoon can be adapted to the newly included vehicle, if the candidate is accepted. If the lead vehicle L finds that the candidate following vehicle has a too limited state control capability to fit in the platoon, or if the number of following vehicles is too high, the lead vehicle L may refuse connection of the candidate following vehicle.

The above negotiation is suitable for the claimed control system of the invention. However, the above negotiation, possibly including using above-mentioned grounds for decision of allowing connection or not, may also be useful in other control systems for platoon driving, when a new candidate is to be connected. The negotiation is thus not restricted to being used in conjunction with the claimed control system, but could be used in any platoon control system.

It is preferred to locate the lead vehicle L at the front of the platoon as in the illustrated embodiments, but the lead vehicle can in principle be any vehicle in the platoon.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A control system for travel in a platoon, said platoon comprising a lead vehicle and one or more following vehicles automatically following the lead vehicle, said lead vehicle controlling the movement of said following vehicles, each of said following vehicles and said lead vehicle comprising communication means, wherein said control system comprising a common time base, wherein a control command is communicated from said lead vehicle to at least one of said one or more following vehicles in advance of a control point of time, the control command entails an action to be executed by the one or more following vehicles at the control point in time, the common time base is based on time signals from an external clock where the time signals are received by the lead vehicle and the one or more following vehicles simultaneously, wherein if the time signals from the external clock cannot be received, then the common time base is based on a last time signal received from the external clock.

2. The control system according to claim 1, wherein the common time base has a precision of at least 10 ms.

3. The control system according to claim 1, wherein a time gap between two vehicles of said platoon is less than 0.6 s.

4. The control system according to claim 1, wherein, in case of signals from said external clock being temporarily undeceivable, a time base of an individual vehicle of said platoon is based on the last signal received from said external clock and/or on a time signal sent from said lead vehicle.

5. The control system according to claim 1, wherein said control command is adapted to compensate for dynamic properties of said at least one following vehicle and/or time delays within said platoon.

6. The control system according to claim 1, wherein said proposed action comprises an action expressed as a state control over time for said following vehicle.

7. The control system according to claim 1, wherein said following vehicle proposes to said lead vehicle a possible limited state action instead of said proposed action according to said control command sent from said lead vehicle.

8. The control system according to claim 1, wherein the control systems further comprises a negotiation, which is used when a candidate following vehicle wants to connect to said platoon, said negotiation comprising sending of boundaries for state control of said candidate following vehicle, and wherein said candidate following vehicle is refused to connect to said platoon, if said candidate following vehicle has a too limited state control capability.

9. A use of a common time base in a platoon for controlling travelling in the platoon, the platoon comprising a lead vehicle and one or more following vehicles automatically following the lead vehicle, said lead vehicle controlling the movement of said following vehicles, each of said following vehicles and said lead vehicle comprising communication means, wherein a common time base allows a control command to be communicated from said lead vehicle to at least one of said one or more following vehicles in advance of a control point of time, the control command entails an action to be executed by the one or more following vehicles at the control point in time, the common time base is based on time signals from an external clock where the time signals are received by the lead vehicle and the one or more following vehicles simultaneously, wherein if the time signals from the external clock cannot be received, then the common time base is based on a last time signal received from the external clock.

10. A method for controlling travelling in a platoon, said platoon comprising a lead vehicle and one or more following vehicles automatically following the lead vehicle, said lead vehicle controlling the movement of said following vehicles, each of said following vehicles and said lead vehicle comprising communication means, wherein said method comprising the steps of
 (a) establishing a common time base,
 (b) transmitting a control command from said lead vehicle to at least one of said one or more following vehicles in advance of a control point of time, the control command entails an action to be executed to be executed by the one or more following vehicles at the control point in time, the common time base is based on time signals from an external clock where the time signals are received by the lead vehicle and the one or more following vehicles simultaneously, wherein if the time signals from the external clock cannot be received, then the common time base is based on a last time signal received from the external clock.

11. The method of claim 10 further comprising the step of:
 (c) said at least one of said following vehicles acknowledging the receipt of said control command to the lead vehicle;

and the optional step of:
 (d) said lead vehicle sending an execute demand.

12. The method of claim 10 further comprising the step of:
 (e) said at least one of said following vehicles communicating a message to said lead vehicle that said following vehicle is able or unable to carry out said proposed action according to said control command.

13. The method of claim 12, in the case able was communicated, said method further comprising the step:
 (f) the lead vehicle transmitting an execute command based on step b).

14. The method of claim 12, in the case unable was communicated, said method further comprising the step:
 (g) said at least one of said following vehicles communicating to said lead vehicle a possible limited state action;

and the optional step of:
 (h) the method returning to step b) and said lead vehicle transmitting a new control command based on said limited state action, or alternatively said lead vehicle releasing said platoon.

15. The control system according to claim 1, wherein the common time base has a precision of at least 1 ms.

16. The control system according to claim 1, wherein the common time base has a precision of at least 100 µs.

17. The control system according to claim 1, wherein said vehicles prepare one or more actions in advance of the control point of time.

18. The method of claim 10, wherein said vehicles prepare one or more actions in advance of the control point of time.

* * * * *